US 9,805,764 B2

(12) United States Patent
Escamilla et al.

(10) Patent No.: US 9,805,764 B2
(45) Date of Patent: Oct. 31, 2017

(54) METHODS AND SYSTEMS OF CREATION AND CATALOG OF MEDIA RECORDINGS

(71) Applicant: CoachMyVideo.com, LLC, Las Vegas, NV (US)

(72) Inventors: Jason Escamilla, Las Vegas, NV (US); Jason Henderson, Las Vegas, NV (US)

(73) Assignee: CoachMyVideo.com, LLC, Las Vegas, NV (US)

(*) Notice: Subject to any disclaimer, the term of this patent is extended or adjusted under 35 U.S.C. 154(b) by 0 days.

(21) Appl. No.: 15/280,971

(22) Filed: Sep. 30, 2016

(65) Prior Publication Data

US 2017/0047093 A1 Feb. 16, 2017

Related U.S. Application Data

(63) Continuation of application No. 13/794,586, filed on Mar. 11, 2013, now Pat. No. 9,497,406.

(51) Int. Cl.
*G11B 27/031* (2006.01)
*H04N 5/76* (2006.01)
*H04N 5/765* (2006.01)
*G11B 27/10* (2006.01)

(52) U.S. Cl.
CPC ......... *G11B 27/031* (2013.01); *G11B 27/102* (2013.01); *H04N 5/76* (2013.01); *H04N 5/765* (2013.01)

(58) Field of Classification Search
CPC . G11B 27/031; G11B 27/309; G11B 27/3036; H04N 5/76; H04N 5/765; H04N 5/78263; H04N 5/9201; H04N 21/45457; H04N 21/84
See application file for complete search history.

(56) References Cited

U.S. PATENT DOCUMENTS

| | | | |
|---|---|---|---|
| 6,310,839 B1 | 10/2001 | Lee et al. | |
| 2002/0007485 A1* | 1/2002 | Rodriguez | H04N 5/44543 725/1 |
| 2004/0042764 A1 | 3/2004 | Takinami et al. | |
| 2004/0267738 A1 | 12/2004 | Shin | |
| 2007/0116317 A1* | 5/2007 | Ozawa | G06F 17/30743 381/372 |
| 2009/0177301 A1* | 7/2009 | Hayes | G11B 19/025 700/94 |
| 2010/0082681 A1* | 4/2010 | Adimatyam | G11B 27/32 707/784 |
| 2010/0241691 A1 | 9/2010 | Savitzky et al. | |
| 2012/0114307 A1 | 5/2012 | Yang et al. | |
| 2012/0315014 A1 | 12/2012 | Shuster | |

* cited by examiner

*Primary Examiner* — Huy T Nguyen
(74) *Attorney, Agent, or Firm* — Sheppard, Mullin, Richter & Hampton LLP (57) ABSTRACT

A method for media recording creation and catalog is provided, that creates media recordings according to a reference time provided. The method allows editing the media recordings during and after recording, catalogs the media recordings, and identifies the media recordings that are related to the same event or a related event, that are close in time or space, but may have been recorded independently. The method displays the media recordings synchronizedly according to a reference time.

4 Claims, 5 Drawing Sheets

METHODS AND SYSTEMS OF CREATION AND CATALOG OF MEDIA RECORDINGS

RELATED CASES

This application is a continuation of U.S. patent application Ser. No. 13/794,586 filed on Mar. 11, 2013, the content of which is hereby incorporated herein by reference in its entirety.

FIELD OF THE INVENTION

The present invention relates generally to multimedia, and more particularly, to a method and system of creation, catalog, search and display of media recordings.

BACKGROUND OF THE INVENTION

People create media recordings including video and audio recordings, and pictures for many purposes. For example, a student's performance is recorded as either video or audio recordings, or pictures. An instructor then makes comments and critiques on the recorded video or audio recordings, or pictures. During recording, the recorder must focus on the student's performance to avoid unnecessary footage that is unrelated to the student's performance. If unnecessary footage is recorded, post-production work and clean-up are usually required to edit the original footage and to delete the unnecessary recordings. Further, as recordings from different perspectives reveal different information of the same event, a commentator needs to review multiple videos or pictures of the same event in synchronizedly to recreate the event and obtain a complete information from the recreation. However, different media recordings including video and audio recordings and pictures may be created by different devices having different device times. The recordings may start and end at different times. The recordings may or may not have been recorded by users working in coordination with one another. Without reviewing the recordings, it is very difficult to identify the content of which recordings are related to the event. The process of editing media recordings to remove unnecessary footages, searching and identifying related media recordings that are relevant to the event can be time-consuming and prone to errors.

BRIEF SUMMARY OF EMBODIMENTS OF THE INVENTION

Embodiments of the present invention are directed toward a method and system for creating, cataloging, searching, and displaying media recordings. According to one embodiment, the method creates media recordings according to a reference time provided. All the media recordings created by the disclosed method can be synchronized according to the reference time provided. In various embodiments, the media recordings may comprise event data or event parameters, relative time, bookmarks of time, scene labels, or subject labels. A user can easily search for a media recording based on the event data or event parameters, relative time, bookmarks of time, scene labels, subject labels, or other parameters without reviewing the content of the media recordings.

Further, the method identifies the media recordings that are related to the same or a related event, or the media recordings that have closeness in time or space. In various embodiments, media recordings created by the method and system described herein can be displayed according to a reference time. The reviewer of such display of media recordings may have full control of all the players used. Illustrative but not limiting control actions include play, pause, stop, skip, step, seek, scrub, etc.

Additionally, the method creates media recordings in such a way that no post-production editing is necessary. In various embodiments, the method keeps only the desired portion of the media recordings in accordance with a user's instruction and deletes the undesired portion. In some embodiments, the recordings may be maintained according to a system time or a relative time or both. The method may calculate accurate relative-time details and allow a user to override a relative time. The method may combine all the desired portions of the media recording or of a series of media recordings.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for creation, catalog, display, search, and review of media recordings. Through various embodiments of the present invention, creators can create media recordings according to a reference time provided. Media recordings created may be reviewed according to the reference time provided. Further, media recordings may comprise event parameters, relative time, bookmarks of time, scene labels, subject labels, or other identifiers. The method and system catalog the media recordings in various ways so that a user may identify related recordings, search for media recording(s) without reviewing content of the media recordings.

Figure 1:
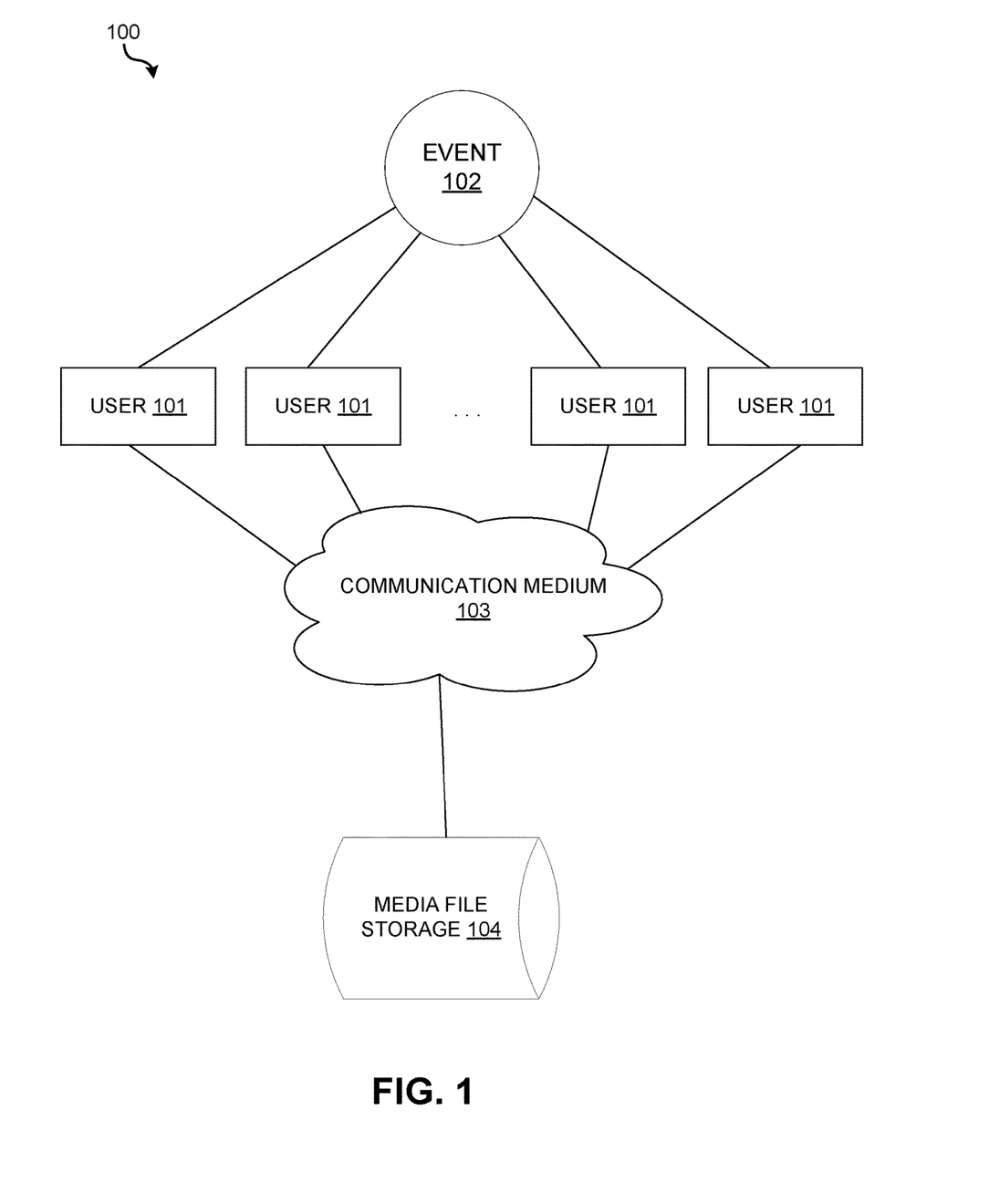
FIG. 1 is a diagram illustrating a simplified environment in which some embodiments in accordance with the disclosed method and system herein may be implemented.

Before describing the invention in detail, it is useful to describe an example environment with which the invention can be used. FIG. 1 illustrates a simplified environment in which some embodiments in accordance with the disclosed method and system herein may be implemented. The network of FIG. 1 will be described for this purpose. A communication medium 103 is shown. In various embodiments, the communication medium may be a wired system, such as a coaxial cable system, a fiber optic cable system, an Ethernet cable system, or other similar communication medium; or alternatively, the communication medium may be a wireless network system, such as a wireless personal area network, a wireless local area network, a cellular network, or other similar communication medium.

In the illustrated example environment, a user 101 creates one or more media recordings of an event 102 by using various computing devices, such as a laptop, a smart phone, a desktop, a tablet, or other similar devices. A user may be a human, a system, a computer or computer program, or other entities. Various computing devices may have different operating systems. The media recording can be a picture, a video recording, an audio recording, or other type of media recordings. The media recording can also be encoded differently, for instance, a .jpg file, a .pnf file, an .avi file. In various embodiments, the user 101 may choose to store the created media recordings locally on the device where the media recording is created or to send the media recordings to a media recording storage 104 for storage and catalog. The various computing devices and the media recording creation and catalog system described herein may be implemented using the example computer system illustrated in FIG. 5.

Figure 2:
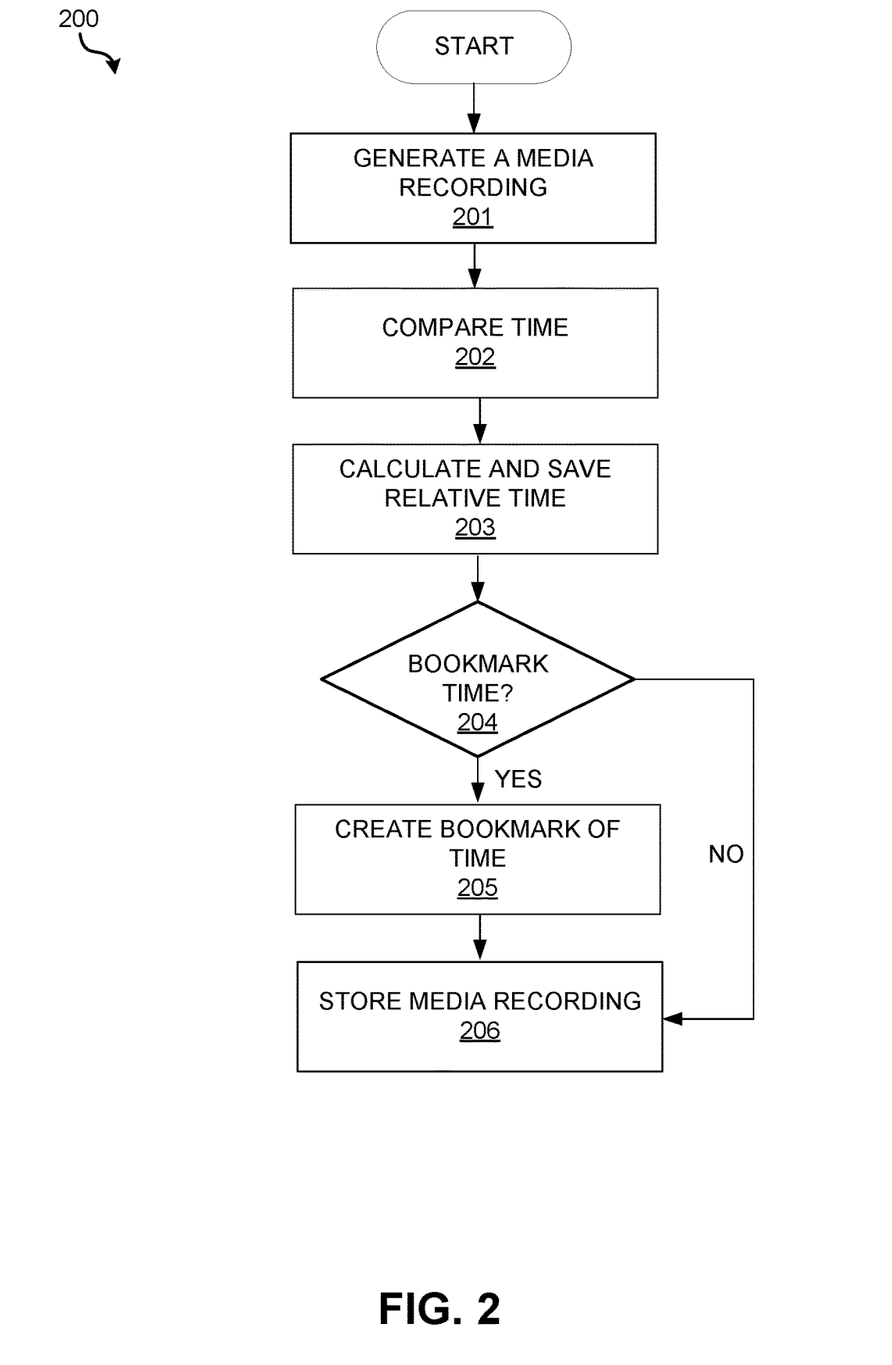
FIG. 2 is a flow chart illustrating an exemplary media recording creation method in accordance with an embodiment of the systems and methods described herein.

FIG. 2 is a flow chart illustrating an exemplary media recording creation method in accordance with an embodiment of the systems and methods described herein. In some cases, a user may initiate creating a media recording of an event. At operation 201, the method generates a media recording of the event by start recording the event. At operation 202, the method compares the relative time to the local time or the system time. The local time is the device time where the event is recorded, i.e., the media recording is created. The system time may be the server time or a standard time service. In one embodiment, the time service provides the reference time, which may be a global time. By comparing the relative time to the local time or the system time, the method determines the relative time of for each recording. At operation 203, subsequent to determining the relative time for a recording, the method calculates and saves the relative time information as part of the custom meta-data for the media. In one embodiment, the method may synchronize time with a Simple Network Time Protocol ("SNTP") server. In one embodiment, the method may provide a reference time and synchronize the local time with the reference time. In some embodiments, a user may override a relative time of a recording.

At operation 204, the method determines whether a bookmark of time at a certain time or relative time should be created. The method may make the decision according to a user's choice. At operation 205, the method creates a bookmark of time or mark the relative time. The method may allow a user to name the bookmark of time. A user may create a scene label by naming the bookmark of time at a certain time or naming the relative time. A scene label provides information related to a scene of an event. For example, when a parent creates a media recording related to a child practicing soccer, the parent may bookmark the time when the child scores a goal and creates a scene label of that bookmark of time in the media recording. The scene label comprises scene data or scene parameters and provides information related to the scene in which the child scores a goal. In one embodiment, a user may create bookmarks of time while still recording the event and the method may calculate the relative time. In another embodiment, a user may create bookmarks of time after finishing recording of the event.

Still referring to FIG. 2, at operation 206, the method stores the media recording. The media recording comprises event data or event parameters of an event. Examples of event data or event parameters are the name of the event, location of the event, time of the event, description of the event. The media recording may also comprise subject labels. A subject label comprises subject data or subject parameters and provides information of various subjects of the event. For example, in a media recording of a soccer game, each player is a subject of the soccer game and the stadium is also a subject of the soccer game. In one embodiment, the method allows a user to create configurable details that are relevant to a subject of an event. Scene labels and subject labels provide additional information that is relevant to the event. Additionally, the media recording may comprise bookmarks of time or the relative time and the associated scene labels. In various embodiments, the bookmarks of time that have associated scene labels are stored separately from the bookmarks of time that have no associated scene labels in the media recording. The method also stores a time record in the media recording. The time record comprises time information of the media recording, such as the starting time, the finish time, time of each bookmark of time, or the corresponding relative time for the starting time, the finish time, and the time of each bookmark of time, etc. In one embodiment, a time record may be a relative time and the method maintains the relative time of a recording. In one embodiment, the method provides the time record according to the time of the reference time service. The method may also store a location record in the media recording. The location record comprises location information of the media recording, such as the starting location, the finish location, location of each bookmark of time, etc. The method allows the user to apply scene labels or subject labels to multiple media recordings together after the media recordings are grouped into a group.

Still referring to FIG. 2, the method further edits the media recording while still recording. For example, during a soccer practice, a parent must focus on the child to capture all of the child's movement. The parent may be distracted and miss the moment that the child scores a goal. The parent may only be interested in recording every moment that a child scores a goal. In one embodiment, the method stops recording when the user determines to stop recording and only keeps the selected portion of time of the media recording and deletes the rest. For example, a user may select to keep the last 10 seconds of the recording before the user stops the recording. In various embodiments, the method stops recording when the user determines to stop recording, and keeps only the portion of the media recording since the last bookmark of time or the last relative time. For example, a user may record himself practicing golf swings, but only desire to keep the good swings. The user may start recording, and after each good swing, he may choose to keep the only previous five seconds of the recording. Subsequently, he may continue recording and take more swings until he makes another good swing, when he may choose to keep the last five seconds of the recording. As such, the method only keeps the recordings of the good swings and discards the recordings in between. Each recording of the good swing is five seconds. No additional editing is necessary and all the recordings are marked as a series of recordings. For example, each bookmark of time or relative time may be flagged to show the corresponding recording series. In another embodiment, the user may continue recording based on a media recording created by others.

The user may create various bookmarks of time or relative time during recording, and the method keeps the portion of the media recording that is from the last bookmark or relative time and deletes the rest. For example, while recording a baseball batter, the user wants to continue recording until the batter makes a hit; however, the user may only want to save the last section of the recording when the batter hits the ball. In this case, the user needs only to start the recording and sets a bookmark or relative time after each section of unwanted recordings, e.g. an unsuccessful pitch. The user can then use this method to easily save only the portion of the media since the last bookmark of time or the last relative time.

In further embodiments, the method may combine the desired portions of the media recording and delete the rest. In various embodiments, the method accepts preset or preselected bookmarks of time or relative time, scene labels, and subject labels in a series of media recordings. For example, a parent may create a series of media recordings of the child's soccer practice from different days, wherein the method accepts a bookmark of time from the media recording of the previous day. In one embodiment, a user may edit a recording between two bookmarks or relative time and the corresponding relative time is stored accordingly. For example, a user may trim or add tags to the recording, and the method may calculate and store the relative time of the user's editing.

At the time of recording or subsequent to the recording event, editing and tagging is done while the system maintains relative time. For example, in a one-minute recording that was edited to keep only the last 10-seconds and discard the rest, the system makes the necessary calculations to ensure the relative time for that 10-second recording is properly calculated and stored in the database. In further embodiments, a user may override a calculated relative time. The calculated relative time is stored separately from the override calculated relative time.

Figure 3:
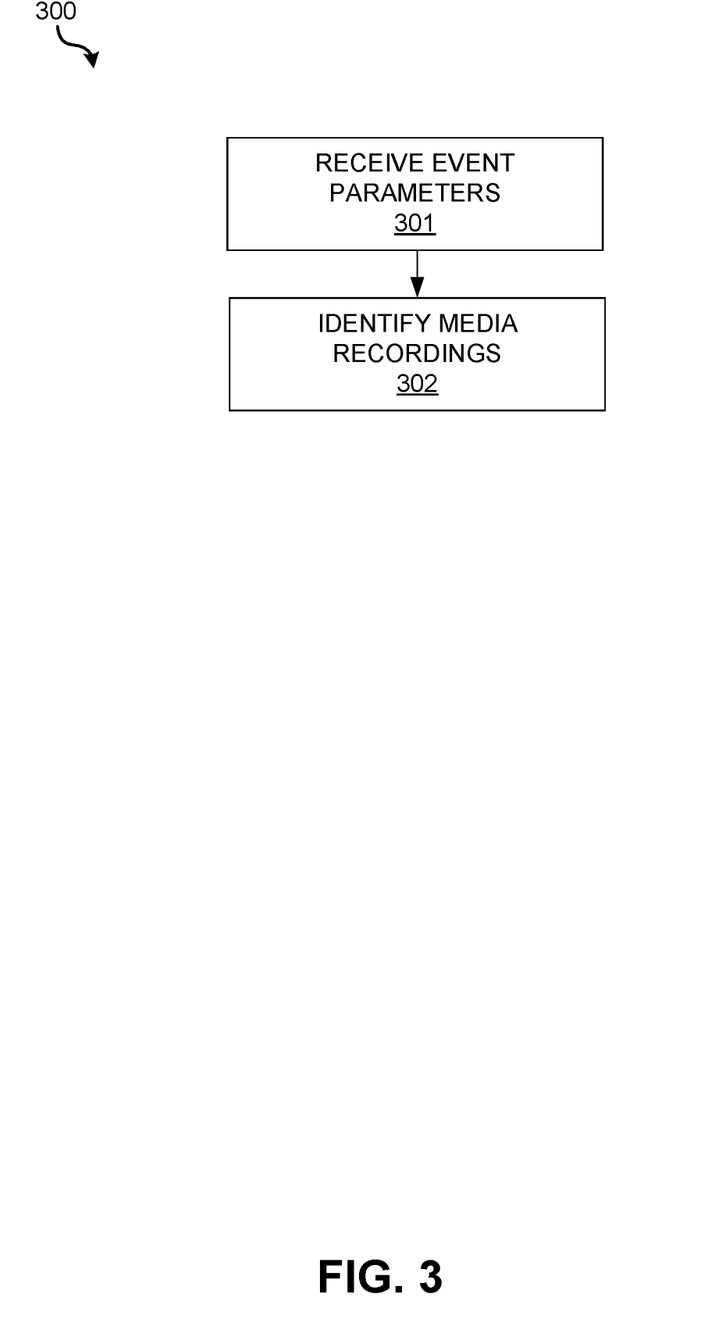
FIG. 3 is a flow chart illustrating an exemplary media recording cataloging method in accordance with an embodiment of the systems and methods described herein.

FIG. 3 is a flow chart illustrating an exemplary media recording cataloging method in accordance with an embodiment of the systems and methods described herein. The method stores and catalogs the media recordings, identifies all the media recordings of the same event or related events, which may or may not be close in either space or time. The method also identifies media recordings that are close in either space or time. In one embodiment, the method may allow a user to define how close in either space or time the media recordings should be. Two media recordings are close in time when the two media recordings have overlap or proximity in time intervals, as determined by a single global time or a time service such as "Nov. 11, 2011 at 11:11 AM Eastern Time" overlaps with "Nov. 11, 2011 at 8:11 AM Pacific Time". Alternatively, two media recordings can have overlap or proximity in time intervals, as determined by a common local time; for example: "Nov. 11, 2011 at 11:11 AM Eastern Time" overlaps with "Nov. 11, 2011 at 11:11 AM Pacific Time" in terms of local-time-proximity. Another example of local-time-overlap or proximity: "Midnight, Dec. 31, 2012 Eastern Time" overlaps with "Midnight, Dec. 31, 2012 Pacific Time". Or "Sunset Dec. 31, 2012 Greenwich Mean Time" can have local-time overlap or proximity with "Sunset Dec. 31, 2012 Pacific Time". Two media recordings are close in space when the two media recordings have overlap or proximity in space in terms of geography or location data.

At operation 301, the method receives a set of event parameters. The set of event parameters are associated with an event. At operation 302, the method identifies a set of media recordings that are also associated with the event determined by the set of event parameters, or that are related to that event determined by the set of event parameters. For example, during a soccer game, some audience record the game from different spatial perspectives and create a number of video recordings of the soccer game. These recordings are all related to the same event, i.e., the soccer game. However, the audience may start recording at different times and end at different times. Accordingly, the media recordings may have different starting and end times, and some of the media recordings may have overlapping time intervals. The method will recognize all the media recordings that are related to the soccer game, and further identify those media recordings that are close in time and space.

Still referring to FIG. 3, in one embodiment, the method identifies media recordings according to a user's query. The method allows a user to search based on scene labels, bookmarks of time including the associated scene labels or relative time, and subject labels. The method identifies the media recordings of which the scene labels, bookmarks of time or relative time and subject labels match or are close to the search query, and provides the media recordings to the user. For example, a user may want to review all the media recordings that are related to a soccer player's scoring a goal regardless of the event, i.e., soccer games. The user may submit a query based on the subject, i.e., the soccer player; the scene, i.e., the soccer players scoring; and the bookmark of time or relative time, i.e., the soccer player scores a goal at a certain time point in a particular soccer game. The method identifies all the media recordings that have the subject, the scene, or have the time that is close to the bookmark of time or the relative time.

With further reference to FIG. 3, in one embodiment, the method identifies media recordings that are close in one of the event parameters, or one of the scene labels, or one of the subject labels, or one of the bookmarks of time or relative time of a media recording. The method provides media recordings related to the media recording of interest to the user. A media recording is related to another media recording when they have closeness in either space or time, event parameters, subject labels, bookmarks of time or relative time, or related to the same or similar events.

Figure 4:
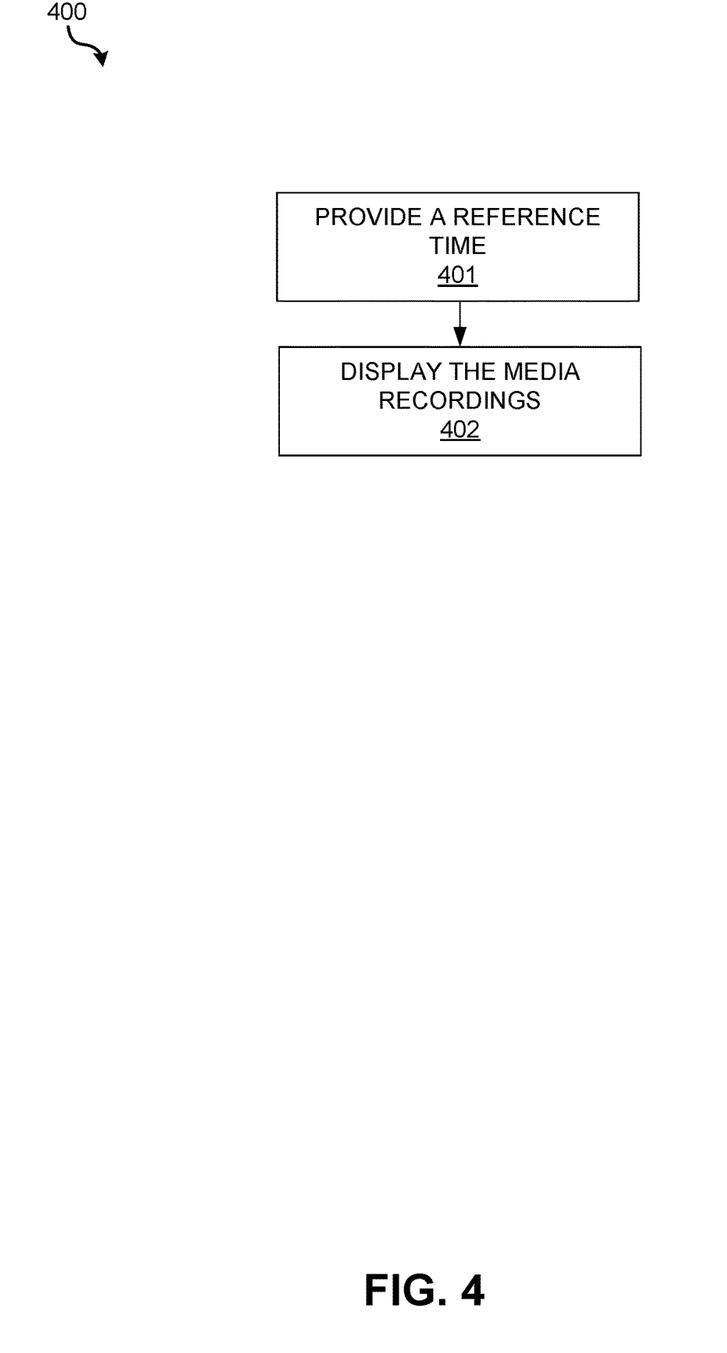
FIG. 4 is a flow chart illustrating an exemplary media recording display method in accordance with an embodiment of the systems and methods described herein.

FIG. 4 is a flow chart illustrating an exemplary media recording display method in accordance with an embodiment of the systems and methods described herein. At operation 401, the method provides a reference time. At operation 402, the method displays the media recordings, which may be created by different devices, different users at different times from different locations. The media recordings may or may not be related to the same event or comprise the same subject. The media recordings may or may not have overlapping intervals. The method displays the media recordings according to the reference time provided. The method also displays the media recordings having overlapping time intervals synchronizedly according to the reference time. In one embodiment, the method determines the earliest time point of all the media recordings and displays the media recordings from that earliest time point. In various embodiments, the method sets the current time of the players in which the media recordings are displayed to a reference time. The method further allows a reviewer of the media recordings to have fully control of all the players used to play the media recordings, such as play, pause, step, skip, seek, scrub, etc. In one embodiment, the method may re-calibrate the synchronization at any time during playing.

The terms "less than," "less than or equal to," "greater than," and "greater than or equal to," may be used herein to describe the relations between various objects or members of ordered sets or sequences; these terms will be understood to refer to any appropriate ordering relation applicable to the objects being ordered. The terms "a set of" and "the set of" may be used herein to describe the quantity of various objects is one or more.

As used herein, the term "system" might describe a given unit of functionality that can be performed in accordance with one or more embodiments of the present invention. As used herein, a system might be implemented utilizing any form of hardware, software, or a combination thereof. For example, one or more processors, controllers, ASICs, PLAs, PALs, CPLDs, FPGAs, logical components, software routines or other mechanisms might be implemented to make up a system. In implementation, the various systems described herein might be implemented as discrete systems or the functions and features described can be shared in part or in total among one or more systems. In other words, as would be apparent to one of ordinary skill in the art after reading this description, the various features and functionality described herein may be implemented in any given application and can be implemented in one or more separate or shared systems in various combinations and permutations. Even though various features or elements of functionality may be individually described or claimed as separate systems, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent system names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Where components or systems of the invention are implemented in whole or in part using software, in one embodiment, these software elements can be implemented to operate with a computing or processing system capable of carrying out the functionality described with respect thereto. One such example-computing system is shown in FIG. 5.

Various embodiments are described in terms of this example-computing system 500. After reading this description, it will become apparent to a person skilled in the relevant art how to implement the invention using other computing systems or architectures.

Figure 5:
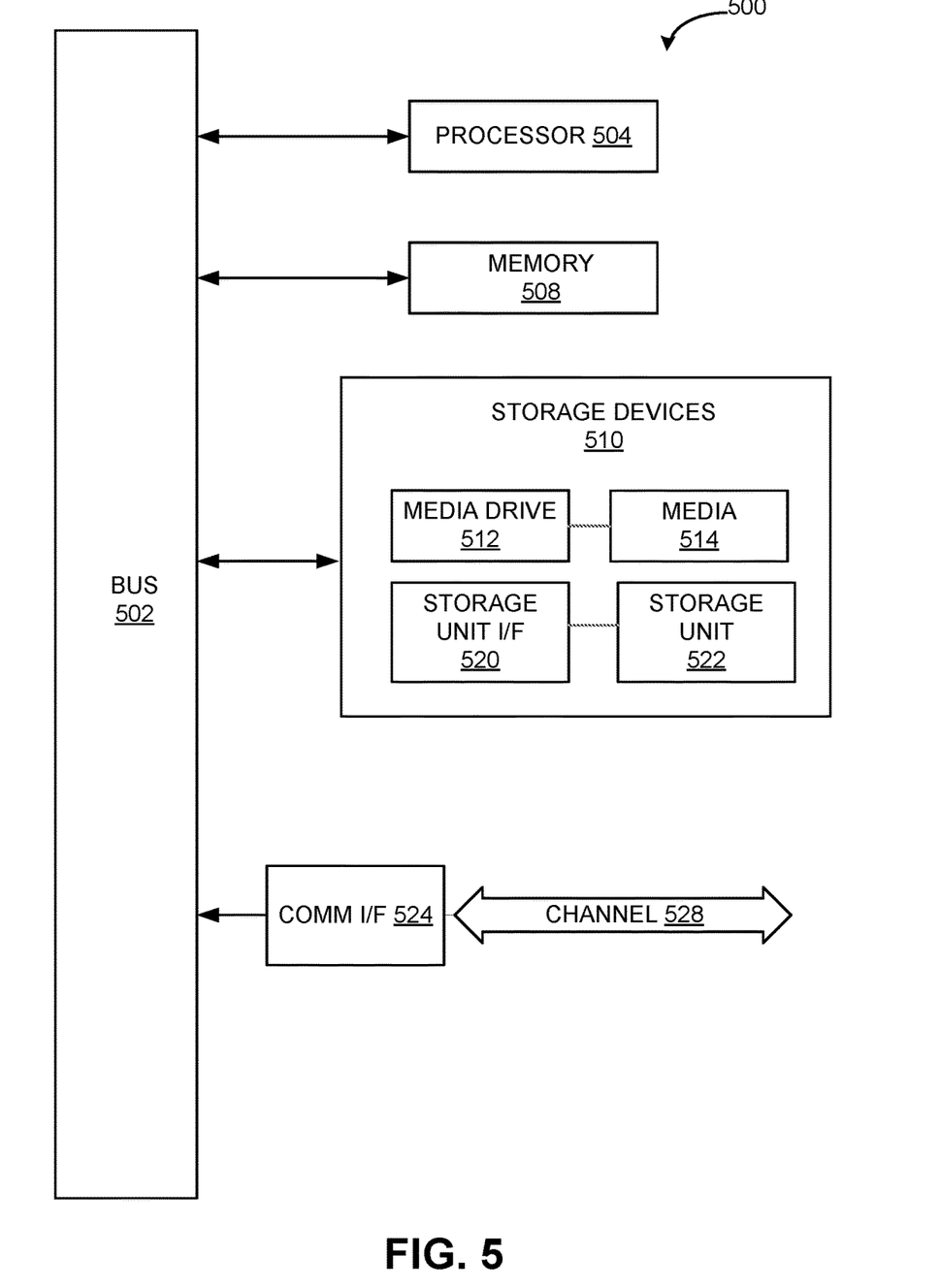
FIG. 5 is a diagram illustrating an example of a computing system that may be used in implementing various features of embodiments of the invention.

Referring now to FIG. 5, computing system 500 may represent, for example, computing or processing capabilities found within desktop, laptop and notebook computers; hand-held computing devices (PDA's, tablets, smart phones, cell phones, palmtops, etc.); mainframes, supercomputers, workstations or servers; or any other type of special-purpose or general-purpose computing devices as may be desirable or appropriate for a given application or environment. Computing system 500 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 500 might include, for example, one or more processors, controllers, control systems, or other processing devices, such as a processor 504. Processor 504 might be implemented using a general-purpose or special-purpose processing engine such as, for example, a microprocessor, controller, or other control logic. In the example illustrated in FIG. 5, processor 504 is connected to a bus 503, although any communication medium can be used to facilitate interaction with other components of computing system 500 or to communicate externally.

Computing system 500 might also include one or more memory systems, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing system 500 might likewise include a read only memory ("ROM") or other static storage device coupled to bus 503 for storing static information and instructions for processor 504.

The computing system 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing system 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory system) and memory slot, a PCMCIA slot and card, and other fixed or removable storage units 522 and interfaces 520 that allow software and data to be transferred from the storage unit 522 to computing system 500.

Computing system 500 might also include a communications interface 524. Communications interface 524 might be used to allow software and data to be transferred between computing system 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and signals on channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent system names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "system" does not imply that the components or functionality described or claimed as part of the system are all configured in a common package. Indeed, any or all of the various components of a system, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   a media recording system, the media recording system comprising a first processor and a first computer executable program code embodied on a first non-transitory computer readable medium configured to send a media recording to a media catalog system; and
   the media catalog system, comprising a second processor and a second computer executable program code embodied on a second non-transitory computer readable medium configured to cause the second processor to:
      receive a first set of event parameters associated with an event; and
      identify a set of media recordings,
         wherein each media recording comprises a second set of event parameters, and a difference between one event parameter of the second set of event parameters and one event parameter of the first set of event parameters is below a predetermined value, wherein the second computer executable program is further configured to cause the second processor to:
  receive a second media recording comprising the set of event parameters;
  store the second media recording; and
  identify a second set of media recordings, wherein a difference between a time record of each of the second set of media recordings and a time record of the media recording is below a second predetermined value.

2. The system of claim 1, wherein the second computer executable program is further configured to cause the second processor to:
  provide a reference time; and
  display the set of media recordings according to the reference time.

3. The system of claim 2, wherein the second computer executable program is further configured to cause the second processor to:
  determine an earliest point of time amongst the set of media recordings; and
  display the set of media recordings from the earliest point of time.

4. The system of claim 1, wherein one of the second set of media recordings is the media recording, and wherein the media recording further comprises an event label, and wherein the second computer executable program is further configured to cause the second processor to apply the event label to each of the second set of media recordings.

* * * * *